(12) United States Patent
Liu et al.

(10) Patent No.: US 7,199,964 B2
(45) Date of Patent: Apr. 3, 2007

(54) ADAPTIVE VOLTAGE-MODE CONTROLLER FOR A VOICE COIL MOTOR

(75) Inventors: KeXiu Liu, Singapore (SG); MingZhong Ding, Singapore (SG); KianKeong Ooi, Singapore (SG); QingWei Jia, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/170,332

(22) Filed: Jun. 29, 2005

(65) Prior Publication Data

US 2007/0013337 A1 Jan. 18, 2007

(51) Int. Cl.
*G11B 21/02* (2006.01)

(52) U.S. Cl. ...................................................... 360/75
(58) Field of Classification Search ..................... None
See application file for complete search history.

(56) References Cited

U.S. PATENT DOCUMENTS

| | | | |
|---|---|---|---|
| 5,014,232 A | 5/1991 | Andre | |
| 5,844,743 A | 12/1998 | Funches | |
| 6,229,663 B1 | 5/2001 | Yoneda et al. | |
| 6,417,639 B1 | 7/2002 | Schillaci et al. | |
| 6,542,324 B1* | 4/2003 | Galbiati et al. | 360/75 |
| 6,567,230 B1* | 5/2003 | Kagami et al. | 360/75 |
| 6,614,612 B1* | 9/2003 | Menegoli et al. | 360/73.03 |
| 6,617,817 B2 | 9/2003 | Hill | |
| 6,735,038 B2 | 5/2004 | Hill | |
| 6,751,043 B2 | 6/2004 | Magee et al. | |
| 6,795,268 B1 | 9/2004 | Ryan | |
| 6,862,152 B2 | 3/2005 | Wu et al. | |
| 6,970,321 B2* | 11/2005 | Hsin et al. | 360/78.09 |
| 7,016,142 B2* | 3/2006 | Jung et al. | 360/77.02 |
| 2002/0186491 A1 | 12/2002 | Hill | |
| 2004/0036999 A1 | 2/2004 | Soldavini et al. | |
| 2004/0080862 A1 | 4/2004 | Miyata et al. | |

* cited by examiner

*Primary Examiner*—K. Wong
(74) *Attorney, Agent, or Firm*—Fellers, Snider, et al.

(57) ABSTRACT

A voltage-mode VCM controller is provided comprising an Infinite Impulse Response (IIR) filter that modifies a servo control voltage signal to a voltage driver in response to an adaptive compensator that configures the IIR filter in relation to an observed VCM velocity and an actual VCM velocity. An associated method is provided comprising modeling a velocity response of a VCM to a voltage input; inputting the observed velocity and an actual VCM velocity to an adaptive compensator that computes a gain and a VCM response pole frequency in relation to the VCM resistance and inductance; configuring an IIR filter in relation to the computed gain and pole frequency values; and using the IIR filter to modify a voltage command from a servo controller to a power driver.

20 Claims, 4 Drawing Sheets

ADAPTIVE VOLTAGE-MODE CONTROLLER FOR A VOICE COIL MOTOR

FIELD OF THE INVENTION

The claimed invention relates generally to the field of voltage mode controllers and more particularly but without limitation to an adaptive voltage mode controller that compensates for temperature and part-to-part variations of the load parameters.

BACKGROUND

Data storage devices employ voice coil motors (VCM) to position an actuator assembly with great speed and precision. Current-mode drivers have long been effectively used to control the VCM. A current-mode driver requires a high-power linear amplifier and a shunt resistor for measuring the actual current delivered to the VCM.

The cost reduction of eliminating the amplifier and resistor is significant. Furthermore, as form factors keep being reduced and power and performance demands keep increasing, the power budget has become another reason to consider changing the control system from a current-mode driver to a voltage-mode driver.

However, switching to a voltage-mode driver can be problematic because the performance of a voltage-mode driver, unlike its current-mode counterpart, is significantly affected by the VCM dynamics. What is needed is a relatively simple system model approach that adaptively compensates for phase shifting of the VCM response pole frequency in relation to changes in the resistance and inductance of the VCM windings. It is to these improvement features that the embodiments of the present invention are directed.

SUMMARY OF THE INVENTION

Embodiments of the present invention are generally directed to a voltage mode controller for controlling a voice coil motor (VCM).

In some embodiments a voltage-mode VCM controller is provided comprising an Infinite Impulse Response (IIR) filter that modifies a servo control voltage signal to a voltage driver in response to an adaptive compensator that configures the IIR filter in relation to an observed VCM velocity.

In some embodiments a method is provided comprising modeling a response of a VCM to a voltage input; inputting the observed (modeled) velocity and an actual VCM velocity to an adaptive compensator that computes a gain and a VCM response pole frequency in relation to the VCM resistance and inductance; configuring an IIR filter in relation to the computed gain and pole frequency values; and using the IIR filter to modify a voltage command from a servo controller to a power driver.

In some embodiments a data storage device is provided, comprising a data transfer head in a data storing and retrieving relationship with a data storage medium; and means for positionally controlling the head by a voltage mode driver providing a voltage signal to a VCM that is compensated for the VCM resistance and inductance.

These and various other features and advantages which characterize the claimed invention will become apparent upon reading the following detailed description and upon reviewing the associated drawings.

DETAILED DESCRIPTION

Figure 1:
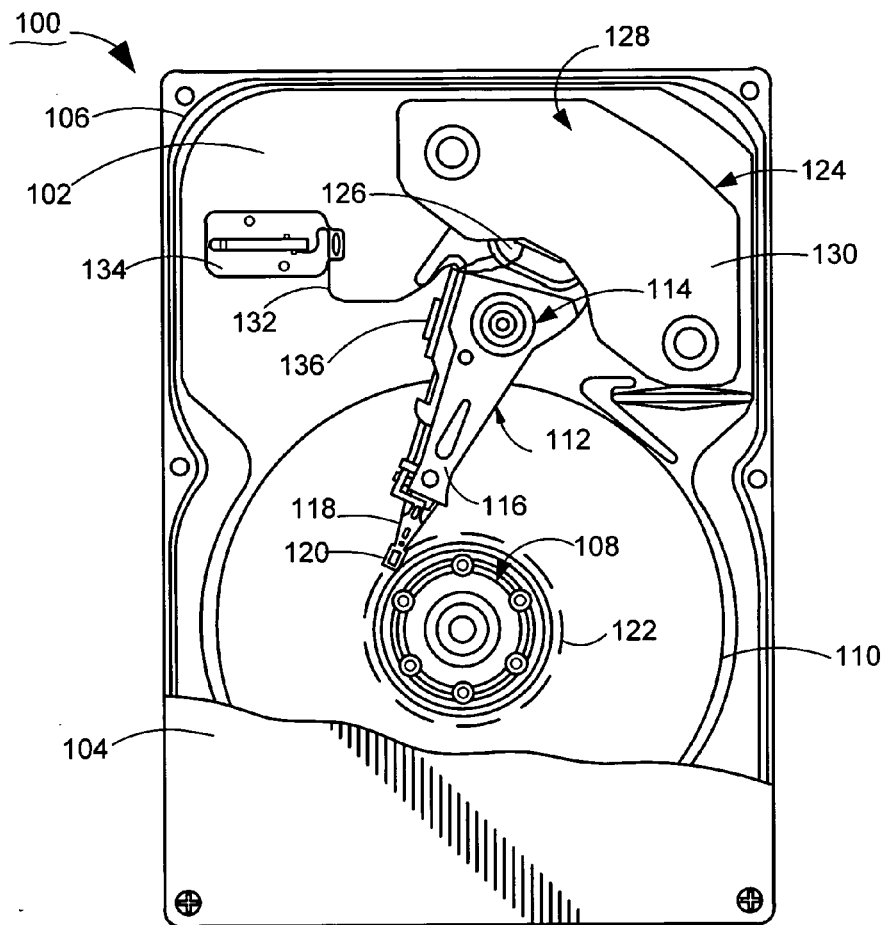
FIG. 1 is a plan view of a data storage device constructed in accordance with embodiments of the present invention.

Referring to the drawings as a whole, and now more particularly to FIG. 1, shown therein is a plan view of a data storage device 100 that is constructed in accordance with embodiments of the present invention. A base 102 and a cover 104 (partially cutaway) with a sealing member 106 interposed therebetween provide a sealed enclosure for a number of components. These components include a spindle motor 108 has fixed in rotation therewith one or more data storage mediums (sometimes referred to as "storage discs") 110.

Adjacent the data storage medium 110 is an actuator assembly 112 which pivots around a bearing assembly 114. The actuator assembly 112 includes an actuator arm 116 supporting a load arm 118 that, in turn, supports a read/write head 120 in a data transfer relationship with the adjacent medium 110.

A recording surface of the medium 110 is divided into a plurality of tracks 122 over which the head 120 is moved. FIG. 1 illustrates only one concentric track 122, but in alternative equivalent embodiments the tracks can be nonconcentric, such as spiral-shaped tracks. The tracks 122 support head position control information written to embedded servo sectors. Between the embedded servo sectors are data sectors used for storing data in the form of bit patterns. The head 120 includes a reader element and a writer element. The writer element stores input data to the tracks 122 during write operations of the disc drive 100, and the reader element retrieves output data from the tracks 122. The output data can be previously stored data that is being recalled for use in processing, or the output data can be servo data used to control the positioning of the head 120 relative to a desired track 122.

The terms "servoing" and "position-controlling," as used herein, mean maintaining control of the head 120 relative to the rotating medium 110 during operation of the data storage device 100. The actuator assembly 112 is positionally controlled by a voice coil motor (VCM) 124, that includes an actuator coil 126 immersed in a magnetic field generated by a magnet assembly 128. A pair of steel plates 130 (pole pieces) mounted above and below the actuator coil 126 provides a magnetically permeable flux path for a magnetic circuit of the VCM 124. During operation of the data storage device 100 current is passed through the actuator coil 126 forming an electromagnetic field, which interacts with the magnetic circuit of the VCM 124, causing the actuator 112 to move the head 120 radially across the medium 110.

To provide the requisite electrical conduction paths between the head 120 and data storage device control circuitry, head wires of the head 120 are affixed to a flex circuit 132. The flex circuit 132 is routed at one end from the load arms 118 along the actuator arms 116, and is secured to a flex connector 134 at the other end. The flex connector 134 supports the flex circuit 132 where it passes through the base 102 and into electrical communication with a printed circuit board assembly (PCBA) (not shown), which can be mounted to the underside of the base 102. A preamplifier/driver (preamp) 136 conditions read/write signals passed between the control circuitry and the head 120.

Figure 2:
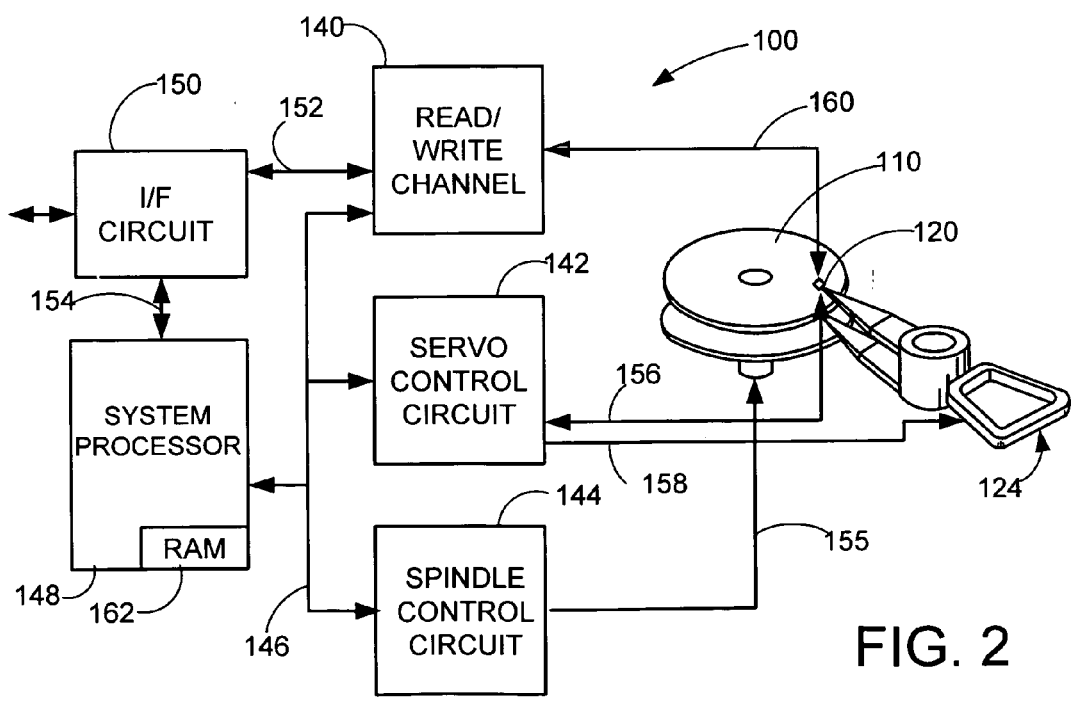
FIG. 2 is a functional block diagram of the data storage device of FIG. 1.

FIG. 2 is a functional block diagram of the data storage device 100 generally comprising a read/write channel 140, a servo control circuit 142, and a spindle control circuit 144, all connected by a control bus 146 to a system controller 148. An interface circuit 150 is connected to the read/write channel 140 by bus 152 and to the system controller 148 by bus 154. The interface circuit 150 serves as a communications interface between the data storage device 100 and a host or network server.

The spindle control circuit 144 controls the rotational speed of the motor 108, and thus the medium 110, by signal path 155. The servo control circuit 142 receives servo position information from the head 120 by way of signal path 156 and, in response thereto, provides a correction signal by way of signal path 158 to an actuator coil portion of the VCM 124 in order to position the heads 120 with respect to the medium 110. The read/write channel 140 passes data to be stored and retrieved from the medium 110, respectively, by way of signal path 160 and the head 120.

Generally, in response to a write command from a host or other network server (not shown in FIG. 2) received by the system controller 148 from the interface 150, the controller 148 controls the flow of data to be written to the storage medium 110. The read/write channel 140, in turn, provides a write current to the head 120 in order to store the data by selectively magnetizing selected data tracks on the medium 110. Alternatively, in response to a retrieve command from the host over the interface 150, the head 120 detects flux transitions from the selected data tracks 122 on the medium 110 and provides an analog read signal to the read/write channel 140, which in turn converts the analog read signal to digital form and performs the necessary decoding operations to provide data to the interface circuit 150 for output to the host. In controlling these operations of the data storage device 100, the system controller 148 employs the use of programming instructions stored in memory 162.

Figure 3:
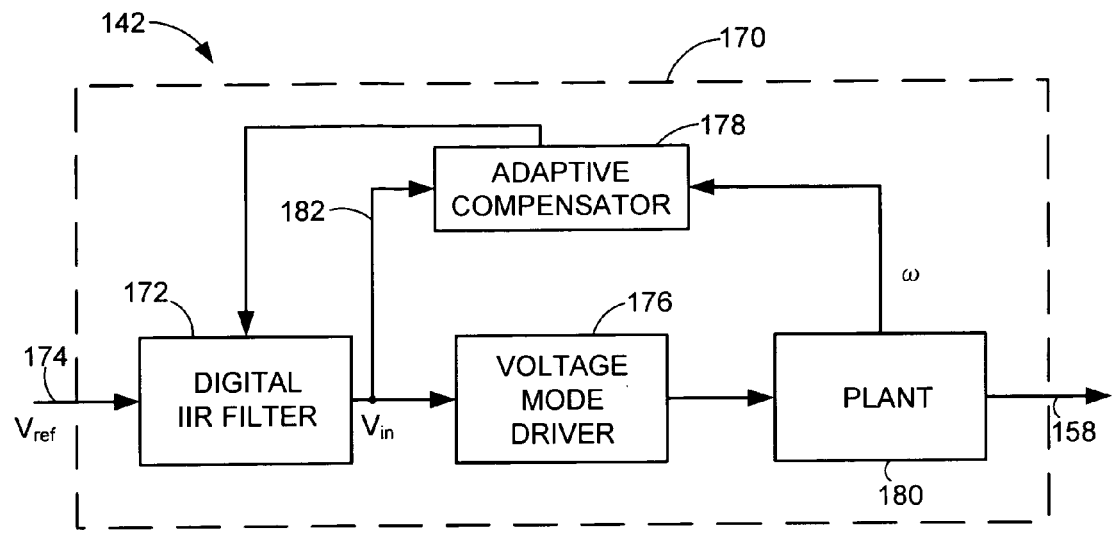
FIG. 3 is a schematic block diagram of a portion of the servo control circuit of FIG. 2.

FIG. 3 is a diagrammatic block diagram of a portion of the servo control circuit 142 that form a voltage-mode VCM controller 170 in accordance with embodiments of the present invention. The voltage-mode controller 170 has an Infinite Impulse Response (IIR) filter 172 that modifies a reference servo control voltage signal 174 to a voltage-mode driver 176 in response to an adaptive compensator 178 that configures the IIR filter 172 in relation to a VCM velocity ω from a VCM response model 180. It will be noted that in the embodiments of FIG. 3 the output of the IIR filter, $v_{in}$ 182, is input to the adaptive compensator 178.

Figure 4:
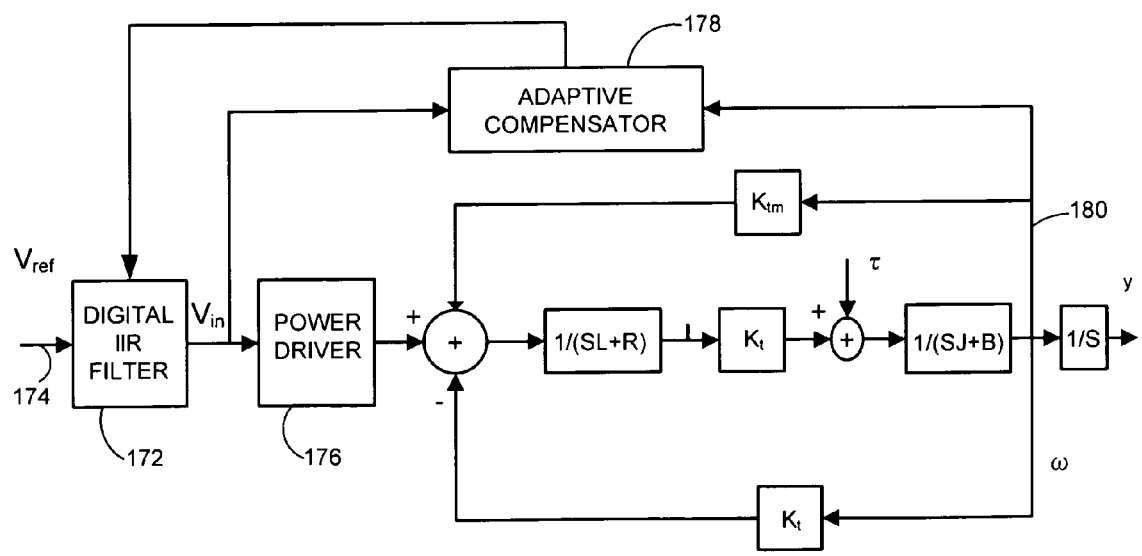
FIG. 4 is a schematic block diagram showing a dynamic system model adopted for performing online identification of VCM parameters.

FIG. 4 is a schematic block diagram describing a system model that can be used for developing the adaptive algorithm of the adaptive compensator 178 for on-line estimation of the VCM windings resistance and inductance in accordance with embodiments of the present invention. In these embodiments, "y" is the angular position of the VCM; ω is the angular speed of the VCM; τ is a disturbance torque action on the VCM. R and L identify the VCM windings resistance and inductance, J identifies the moment of inertia of the VCM, and $K_t$ is the torque constant of the VCM.

It will be noted from FIG. 4 that the voltage-mode controller 170 of the embodiments herein eliminates the need for a current sense amplifier, which is typically used in a current-mode controller. This provides an advantageous cost savings. However, because the VCM is a complex inductive load, it will respond to voltage controls differently as a function of the windings resistance and inductance. Also, there is an inherent phase lag associated with the VCM current being not immediately responsive to a change in voltage control signal. The embodiments of the present invention overcome these challenges and provide a VCM controller that performs comparably to more expensive current-controller systems.

The continuous-time VCM model of FIG. 4 can be expressed as:

$$\frac{\omega(s)}{v_{in}} \cong \frac{k}{(sL+R)(sJ+B)}$$

where k is the gain, R is the resistance of the VCM and L is the inductance of the VCM. Both gain $$\frac{1}{R}$$

and pole frequency $$\frac{R}{2\pi L}$$

are identified online by the algorithm of the present embodiments, in order to compensate for part-to-part variation and temperature variation of R and L. In other words, VCM response pole frequency of the embodiments herein is identified in relation to changes in a VCM inductance and resistance.

If the sampling period of the position error signal (PES) and velocity is $t_s$, then a discrete-time model of the VCM can be defined in terms of a second order system:

$$G_{vis} = \frac{\omega(z)}{v_{in}(z)} = \frac{b_0 z + b_1}{z^2 + a_1 z + a_2}$$

The relative simplicity associated with modeling a second order system is advantageous in reducing system cost and processing performance. For example, during reduction to practice it was observed in comparison to a solution modeling an Extended Kalman Filter (EKF) the embodiments herein were faster by an order of magnitude. That is, the EKF solution requires a dedicated floating-point or fixed-point digital signal processor (DSP), and it was observed that the calculations took at least 30 μs to complete with a 25 MHz fixed-point DSP. However, the embodiments herein involve algorithmic computations that take less than 3 μs with a fixed-point processor without the assistance of a dedicated DSP.

Thus, we have:

$$\omega(k)=\theta^T\psi(k)=b_0v_{in}(k-1)+b_1v_{in}(k-2)-a_1\omega(k-1)-a_2\omega(k-2)$$

where;

$$\theta^T=[b_0 b_1 a_1 a_2] \text{ and } \psi^T(k)=[v_{in}(k-1)v_{in}(k-2)-\omega(k-1)-\omega(k-2)]$$

an estimator can then be defined as:

$$\hat{\omega}(k)=\hat{\theta}^T(k-1)\psi(k), \text{ where } \hat{\theta}^T(k-1)=[\hat{b}_0(k-1),\hat{b}_1(k-1),\hat{a}_1(k-1),\hat{a}_2(k-1)]$$

and an error function defined as:

$$e(k)=\hat{\omega}(k)-\omega(k)$$

the adaptive algorithm thus becomes:

$$\hat{\theta}(k)=\hat{\theta}(k-1)-\gamma e(k)\psi(k)$$

Shifting now to the IIR filter 172, which preferably has a sampling rate that is greater than the PES sampling rate for a higher VCM bandwidth. Corresponding to the pole at R/L in the continuous-time model, the discrete-time model, $G_{\omega td}(Z)$ has a pole at $\beta_{td}$, and the discrete-time VCM model $G_{\omega ts}(z)$ with a sampling period $t_s$ has a pole at $\beta_{ts}$.

Therefore, for a high-bandwidth VCM driver, the IIR filter 172 can be defined as:

$$G_f(z) = \frac{K_f(z-\beta_{td})}{z-P_c}$$

where the value of $p_c$ is dependent on the desired VCM driver bandwidth. The estimation value, $\hat{\beta}_{td}$ of $\beta_{td}$, is obtained by calculating a pole conversion. First, the discrete-time VCM model with sampling period $t_s$ is obtained making use of the identification algorithm above, and thereby obtaining $\hat{\beta}_{ts}$ which is the estimated value of $\beta_{ts}$, one pole of the discrete-time VCM model $G_{\omega ts}(z)$. Then by making use of the following formula for pole conversion between different sampling rates, the estimation of $\beta_{td}$ can be obtained:

$$\hat{\beta}_{td} = \frac{(t_s+t_d)\hat{\beta}_{ts}+(t_s-t_d)}{(t_s-t_d)\hat{\beta}_{ts}+(t_s+t_d)}$$

Finally, the IIR filter 172 can be defined as:

$$G_f(z) = \frac{K_f(z-y^*\hat{\beta}_{td})}{z-P_c}$$

with sampling period $t_d$; the adjusting factor $\gamma$ provides a degree of freedom to optimize the phase drop of the VCM voltage mode driver loop as well as the performance of the whole servo position control loop, thereby affording an opportunity to boost the desired servo loop performance.

The adaptive compensation of the embodiments herein actually operates on down-sample mode because the algorithm first identifies $G_{\omega ts}$ at the sampling period $t_s$ of the system controller 148, otherwise updating information such as the PES and the VCM velocity. Then based on the approximated pole $\hat{\beta}_{ts}$ from the model, the pole $\hat{\beta}_{td}$ is approximated corresponding the sampling period $t_d$, wherein $t_d<t_s$. The adaptive identification algorithm can thus run on down-sample mode because both the identification sampling frequency, $f_d$, and the application sampling frequency, $f_s$, are substantially higher than the VCM pole frequency.

Figure 5:
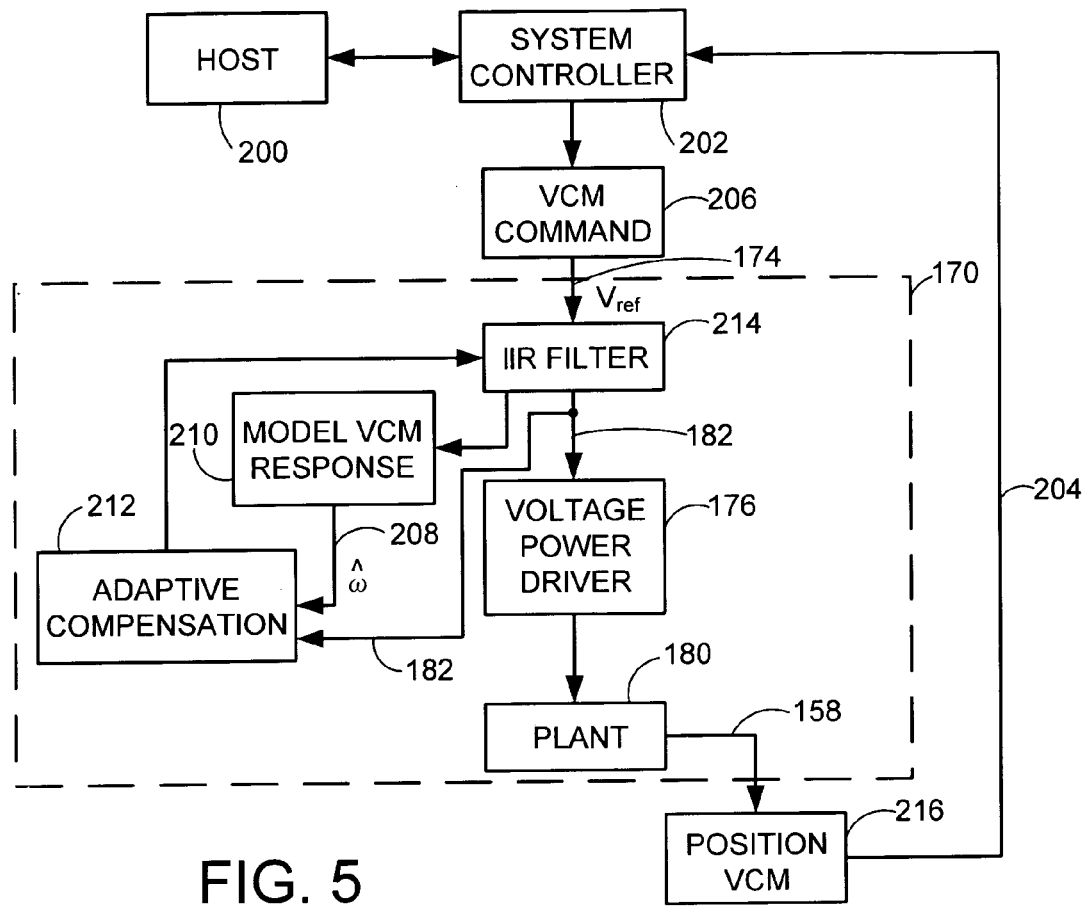
FIG. 5 is a functional block diagram of steps for adaptively controlling a voice coil motor in accordance with the system model of FIG. 4.

FIG. 5 is a block diagram illustrating steps performed by the controller 170 in adaptively controlling the VCM 124 in accordance with embodiments of the present invention. The method begins with a data transaction command from the host in block 200 which is received by the system controller 148 in block 202. The system controller 148 compares the host command with the present position of the VCM via signal 204 and issues a VCM command, $V_{ref}$ 174, in block 206 to the IIR filter 172. This VCM command can involve a small move associated with track following a present track, or it can initiate a seek routine to a different track.

In block 212 the adaptive compensator 178 receives an input of velocity via signal 208 from the model VCM response in block 210, and an input of IIR filter output, $v_{in}$ 182, from the IIR filter 172. The adaptive compensator 178 then reconfigures, as necessary, the coefficients for the IIR filter 172 in block 214. The IIR filter 172 then sends the control signal, $v_{in}$ 182, to the voltage driver 176 that, in turn, sends the voltage signal 158 to controllably position the VCM in block 216.

Figure 6:
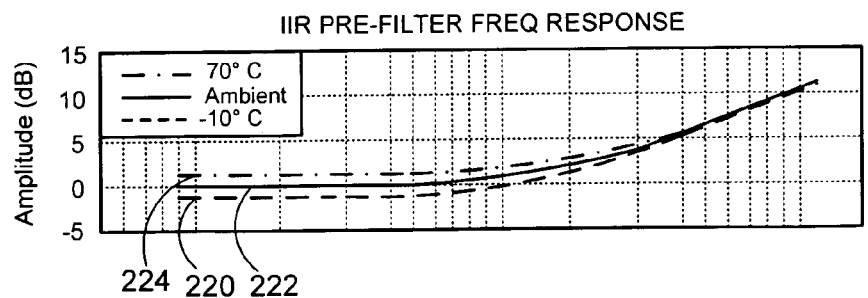
FIGS. 6–8 are graphical representations of the findings from testing embodiments of the present invention.
Figure 6:
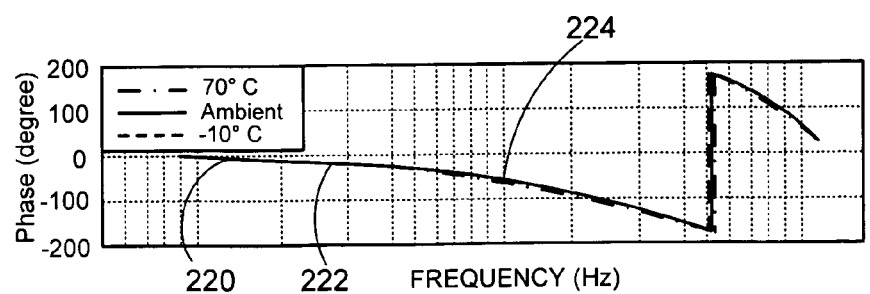

FIG. 6 is a graphical depiction of test results showing the capability of the adaptive filter 172 as embodied herein to compensate in relation to temperature changes. Here it is seen that the frequency responses of the adaptive filter 172 converged among trials that were performed at −10° C. (denoted 220), at ambient temperature (denoted 222), and at 70° C. (denoted 224).

Figure 7:
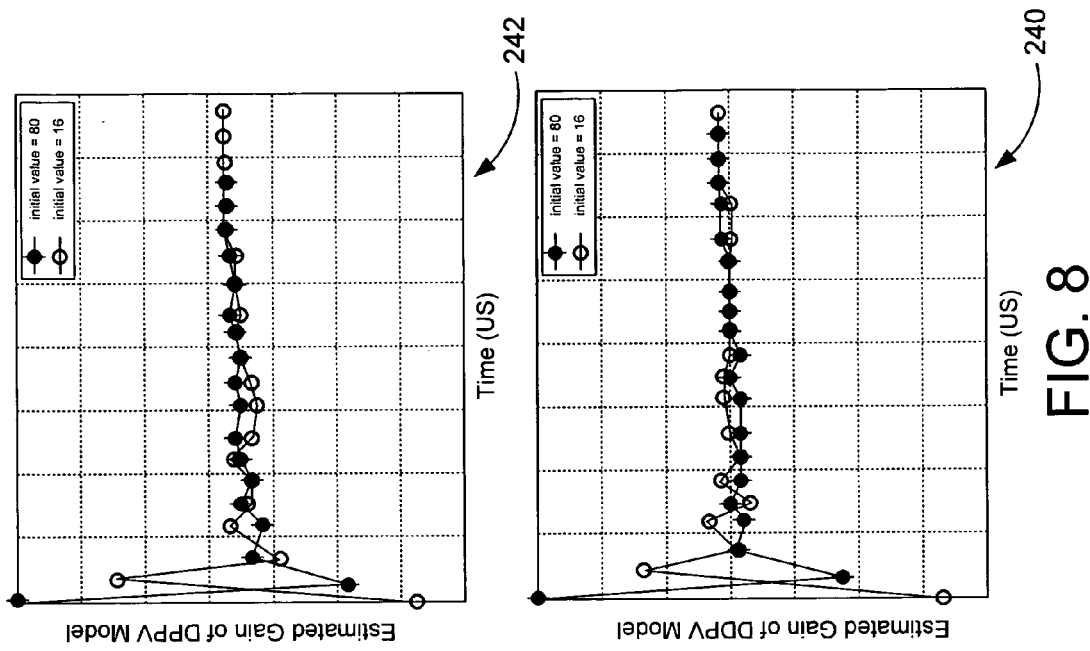

FIG. 7 is a graphical depiction of test results that likewise demonstrate the advantages of the temperature compensating features of the controller 170 of the embodiments herein. The frequency response of gain and pole of a VCM with the adaptive controller 170 (denoted 230) converged substantially better than a comparative VCM without the adaptive controller 170 (denoted 232).

Figure 8:
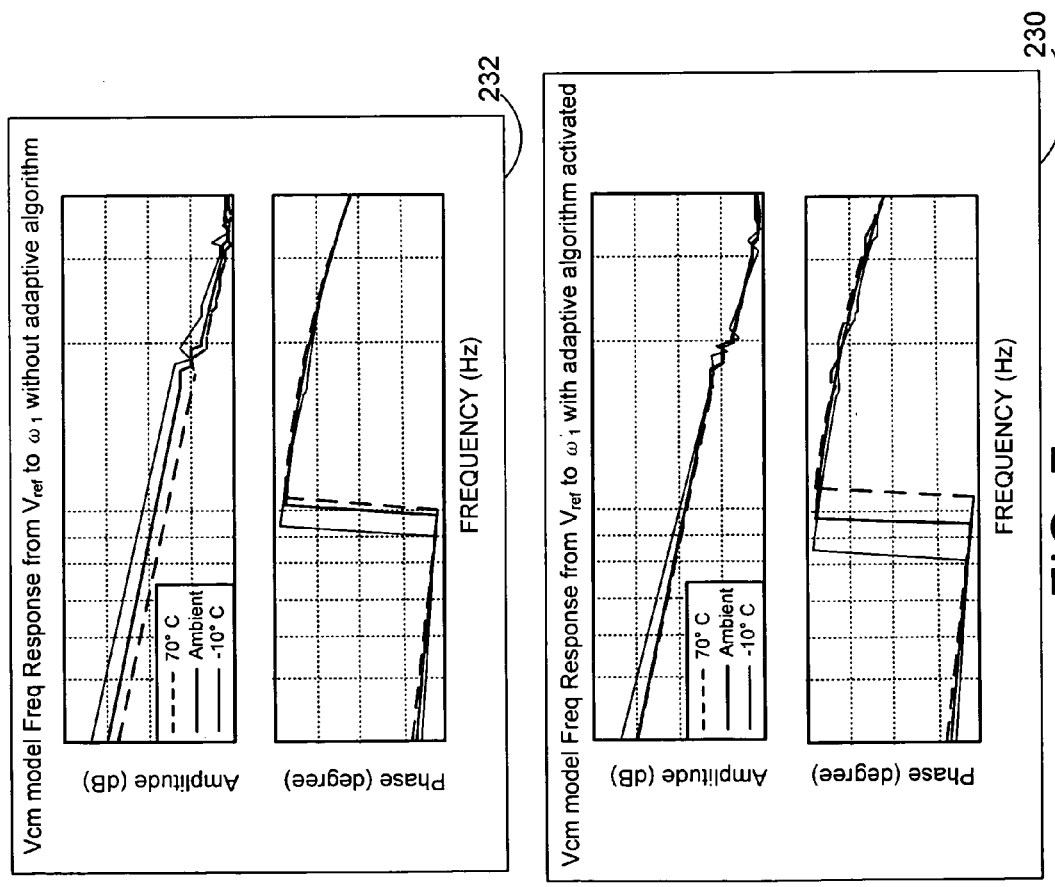

Finally, FIG. 8 is a graphical depiction of test results that likewise demonstrate the coefficient converging rate of the adaptive algorithm at different temperatures in accordance with the present embodiments. Two different initial values converge robustly for trials that were performed at 30° C. (denoted 240) and at 70° C. (denoted 242).

In summary, embodiments of the present invention provide a voltage-mode voice coil motor (VCM) controller apparatus (such as 170) comprising an Infinite Impulse Response (IIR) filter (such as 172) that modifies a servo control voltage signal (such as 174) to a voltage driver (such as 176) in response to an adaptive compensator (such as 178) that configures the IIR filter in relation to an observed velocity and an actual VCM velocity (such as 180).

An output of the IIR filter (such as 182) can be an input to the adaptive compensator. Advantageously for reduced processing time and system overhead the adaptive compensator can employ a discrete-time model of a VCM (such as 124) in terms of a second order system. To most closely approximate the precision of a current-mode controller, the model identifies a gain value and a VCM response pole frequency in configuring the IIR filter. This permits the VCM response pole frequency to be identified in relation to changes in a VCM inductance and resistance.

The adaptive compensation of the IIR filter computes a pole conversion for a sampling rate of the adaptive compensator that is different than a sampling rate of the servo control system. This permits operating the adaptive compensator in a down-sample mode by reconfiguring the IIR filter in relation to the servo control sampling rate.

In some embodiments a method is provided comprising modeling a response velocity of a VCM to a voltage input (such as 210); inputting the modeled (observed) velocity and an actual VCM velocity (such as 208) to an adaptive compensator that computes a gain and a VCM response pole frequency in relation to the VCM resistance and inductance (such as 212); configuring an IIR filter in relation to the computed gain and pole frequency values (such as 206); and using the IIR filter to modify the voltage command from a servo controller to a power driver.

The configuring of the IIR filter step can comprises inputting the output signal from the IIR filter to the adaptive compensator. The modeling step is preferably characterized by a discrete-time model of the VCM in terms of a second order system. The configuring step is preferably characterized by identifying a gain value and a VCM response pole frequency, such that the VCM response pole frequency shifts in relation to changes in a VCM inductance and resistance.

The configuring step can further be characterized by computing a pole conversion for a sampling rate that is different than a sampling rate of the servo controller, such that using step can be characterized by a down-sample mode by modifying the IIR filter in relation to the servo controller sampling rate.

In some embodiments a data storage device is provided, comprising a data transfer head (such as 118) in a data storing and retrieving relationship with a data storage medium (such as 110,); and means for positionally controlling the head by a voltage mode driver providing a voltage signal to a VCM that is compensated for the VCM resistance and inductance.

The means for positionally controlling can be characterized by modeling a discrete-time VCM response in terms of a second order system. The means for positionally controlling can be characterized by digitally filtering the voltage signal with an IIR that is computed in relation to an observed velocity and an actual velocity of the VCM. The means for positionally controlling can be characterized by digitally filtering the voltage signal with an IIR that is computed in relation to a VCM response pole frequency conversion. The means for positionally controlling can be characterized by a pole conversion related to differences between a filtering calculation sampling time and a servo control sampling time. The means for positionally controlling can be characterized by down-sampling the compensation to the VCM.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. A voltage-mode voice coil motor (VCM) controller apparatus comprising an Infinite Impulse Response (IIR) filter that modifies a servo control voltage signal supplied to a voltage mode driver in response to an adaptive compensator that configures coefficients for the IIR filter in relation to an observed VCM velocity and an actual VCM velocity.

2. The apparatus of claim 1 wherein an output of the HR filter is an input to the adaptive compensator.

3. The apparatus of claim 1 wherein the adaptive compensator defines a discrete-time model of the VCM in terms of a second order system.

4. The apparatus of claim 3 wherein the model identifies a gain value and a VCM response pole frequency in configuring the IIR filter.

5. The apparatus of claim 4 wherein the VCM response pole frequency is identified in relation to changes in a VCM inductance and resistance.

6. The apparatus of claim 4 wherein the IIR filter computes a pole conversion for a sampling rate of the adaptive compensator that is different than a sampling rate of the servo control.

7. The apparatus of claim 6 wherein the adaptive compensator is configured for operating in down-sample mode by reconfiguring the IIR filter in relation to the servo control sampling rate.

8. A method comprising:
   modeling a response of a VCM to a voltage input;
   inputting the modeled velocity and an actual VCM velocity to an adaptive compensator that computes a gain and a VCM response pole frequency in relation to a VCM resistance and inductance;
   configuring coefficients for an IIR filter in relation to the computed gain and pole frequency values;
   using the IIR filter to modify a voltage command from a servo controller; and supplying the modified voltage command to a voltage mode power driver.

9. The method of claim 8 wherein the configuring an IIR filter step comprises inputting an output signal from the IIR filter to the adaptive compensator.

10. The method of claim 8 wherein the modeling step is characterized by a discrete-time model of the VCM in terms of a second order system.

11. The method of claim 10 wherein the configuring step is characterized by identifying a gain value and a VCM response pole frequency.

12. The method of claim 11 wherein the configuring step is characterized by identifying the VCM response pole frequency in relation to changes in a VCM inductance and resistance.

13. The method of claim 11 wherein the configuring step is characterized by computing a pole conversion for a sampling rate that is different than a sampling rate of the servo controller.

14. The method of claim 13 wherein the using step is characterized by a down-sampling mode by modifying the IIR filter in relation to the servo controller sampling rate.

15. A data storage device, comprising:
   a data transfer head in a data storing and retrieving relationship with a data storage medium; and
   means for positionally controlling the head by a voltage mode driver supplying a voltage signal to a VCM, the supplied voltage signal is compensated for the VCM resistance and inductance.

16. The device of claim 15 wherein the means for positionally controlling is characterized by modeling a discrete-time VCM response in terms of a second order system.

17. The device of claim 15 wherein the means for positionally controlling is characterized by digitally filtering the voltage signal with an IIR that is computed in relation to an observed velocity and an actual velocity of the VCM.

18. The device of claim 15 wherein the means for positionally controlling is characterized by digitally filtering the voltage signal with an IIR that is computed in relation to a VCM response pole frequency conversion.

19. The device of claim 15 wherein the means for positionally controlling is characterized by a pole conversion related to differences between a filtering calculation sampling time and a servo control sampling time.

20. The device of claim 15 wherein the means for positionally controlling is characterized by down-sampling the compensation to the VCM.

* * * * *

UNITED STATES PATENT AND TRADEMARK OFFICE
CERTIFICATE OF CORRECTION

PATENT NO. : 7,199,964 B2 Page 1 of 1
APPLICATION NO. : 11/170332
DATED : April 3, 2007
INVENTOR(S) : KeXiu Liu et al.

It is certified that error appears in the above-identified patent and that said Letters Patent is hereby corrected as shown below:

In Col. 8, line 5
replace "of the HR"
with --of the IIR.--

Signed and Sealed this

Tenth Day of July, 2007

JON W. DUDAS
*Director of the United States Patent and Trademark Office*